United States Patent [19]

Morreale

[11] 4,224,543
[45] Sep. 23, 1980

[54] PRINTED CIRCUIT TERMINAL FOR INTERCONNECTING STATOR COILS

[75] Inventor: Anthony P. Morreale, Whittier, Calif.

[73] Assignee: Rapidsyn Co., Santa Fe Springs, Calif.

[21] Appl. No.: 929,909

[22] Filed: Aug. 1, 1978

[51] Int. Cl.² .......................................... H02K 11/00
[52] U.S. Cl. ...................................... 310/71; 310/194; 310/DIG. 6
[58] Field of Search .................... 310/71, 260, DIG. 6, 310/179, 68, 68 D, 194, 42, 91, 180, 184, 254–259; 336/192; 339/17 R

[56] References Cited

U.S. PATENT DOCUMENTS

| | | | |
|---|---|---|---|
| 3,495,109 | 2/1970 | Ames | 310/260 |
| 3,869,628 | 3/1975 | Koritsky | 310/179 |
| 4,039,875 | 8/1977 | Morreale | 310/DIG. 6 |
| 4,065,686 | 12/1977 | Moore | 310/68 D |
| 4,096,625 | 6/1978 | Morreale | 310/71 |
| 4,103,193 | 7/1978 | Ito | 310/68 D |
| 4,115,915 | 9/1978 | Godfrey | 310/180 |

*Primary Examiner*—R. Skudy
*Attorney, Agent, or Firm*—Christie, Parker & Hale

[57] ABSTRACT

A motor stator having a salient pole magnetic core on which are wound coils of conductive wire incorporating an annular printed circuit board having a plurality of terminals formed around the outer periphery of the board. The terminals are formed by radially extending conductive regions, each region having a V-shaped notch extending in from the periphery of the printed circuit board. The printed circuit board is secured directly to the projecting ends of the coils at one end of the core and the two wire ends of each coil are secured in adjacent notches.

2 Claims, 2 Drawing Figures

PRINTED CIRCUIT TERMINAL FOR INTERCONNECTING STATOR COILS

FIELD OF THE INVENTION

This invention relates to wire-wound motor stators, and more particularly, is concerned with a printed circuit board for interconnecting the coil wires.

In my U.S. Pat. No. 4,039,875, hereby incorporated by reference, there is described a printed circuit board arrangement for interconnecting stator coils of a salient pole motor. The individual coils wound on each salient pole are electrically interconnected by a printed circuit board, annular in shape, positioned against the projecting coil ends at one end of the stator. The printed circuit board is formed with a plurality of radially projecting terminals; the ends of the coils are wrapped around and soldered to the radially projecting terminals. While the arrangement described in the above-identified patent has proved satisfactory for small motors using relatively fine magnet wire, it has been found that on larger motors where heavier magnet wire is used in making the coils, the projecting terminals tend to break under the stress imposed by the heavier wire.

SUMMARY OF THE INVENTION

The present invention is an improvement on the interconnecting circuit board for stator coils described in the above-identified patent. In the present invention, the radial terminals around the outer periphery of the annular circuit board are formed with spaced V-shaped notches. Each notch is surrounded on the opposing surfaces of the board by a printed circuit terminal. The stator is assembled by placing the printed circuit board against the projecting ends of the coils of the salient pole stator core. The two wire ends of each coil are wedged in adjacent pairs of notches and soldered to the adjacent printed circuit terminals to complete the electrical interconnection of the coil windings.

DESCRIPTION OF THE DRAWINGS

For a more complete understanding of the invention, reference should be made to the accompanying drawings, wherein.

DETAILED DESCRIPTION

Figure 1:
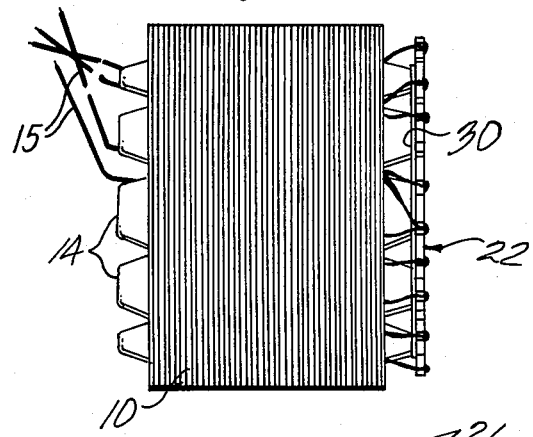
FIG. 1 is a side view of a completed stator assembly.
Figure 2:
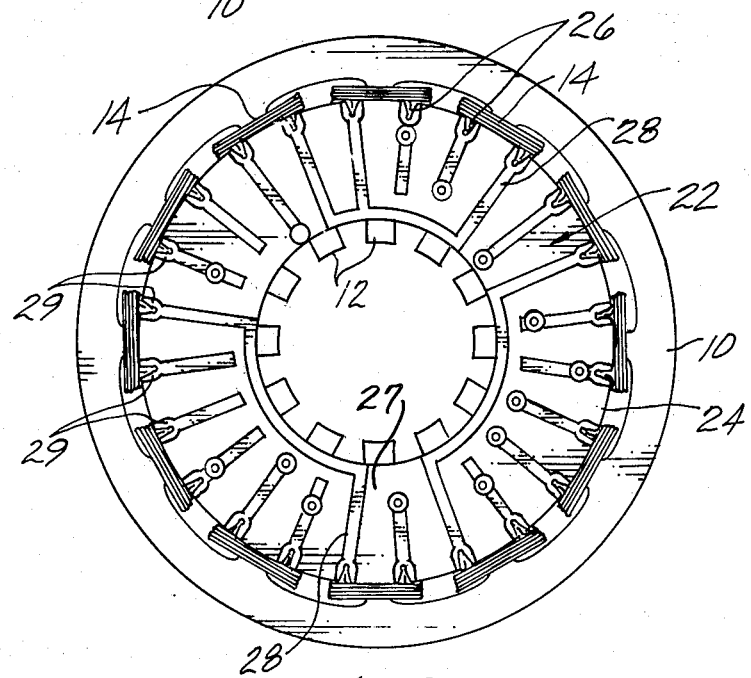
FIG. 2 is an end view of the completed stator assembly.

Referring to the drawings, the numeral 10 indicates generally the magnetic core of a stator which is made up of a stack of laminations in conventional manner. The stator core is formed with a plurality of inwardly projecting salient poles 12, the inner ends of which are machined to define a cylindrical shape opening in which the rotor of the motor (not shown) rotates after the motor is assembled. The machine winding process wraps a continuous length of solid copper wire on each pole, advancing from pole to pole in sequence around the circumference of the stator core 10, the coils being indicated at 14. The wire between adjacent coils is brought out in loops.

After the coils are wound on the stator core a printed circuit terminal board 22 is secured to the end position on the projecting wire coils at one end of the stack. The terminal board includes a substrate 24 of insulating material, such as a sheet of fiberglass or the like, having an annular shape with a plurality of radial notches 26 spaced about the outer perimeter of the board. Each notch 26 is V-shaped and terminates in an intersecting hole at the inner end of the notch. The round hole forms a slightly enlarged undercut opening at the base of the V-notch. Etched on the top surface 27 of the terminal board 22, by a conventional printing circuit technique, is a pattern of conductive strips 28 which include radially extending terminal portions 29 adjacent each of the notches. The conductive terminal portions are preferably provided on both surfaces of the terminal board. Some of the terminals and strips are interconnected on the top of the board while others are interconnected on the opposite side of the board, with the strips on opposite sides of the board being interconnected by extending the conductive metal through holes in the board.

The terminal board is initially held in place during the assembly of the completed stator by a pressure-sensitive adhesive. The wire loops between adjacent coils are cut and the two wire ends of each coil are then wedged into a pair of adjacent notches 26. After all the wire ends are inserted in the appropriate notches in the circuit board, the wire ends are soldered to the terminals and the excess wire is removed. The soldered wire connections to the circuit board act to further anchor the terminal board in position.

After the terminal board is wired in place, external leads 15 are connected to the terminal board by passing the leads through the length of the stack in the spaces between the adjacent coils. The ends of the external leads are inserted in appropriate notches 26 and soldered to the terminals. The entire assembly is then dipped by means of the external leads into a varnish pot to coat and seal the coils in place and to bond the terminal board and coils more firmly together to form an integral structure.

What is claimed is:

1. In a motor stator having a cylindrical core of magnetic material defining a plurality of radial poles on which are wound coils of conductive wire, apparatus for interconnecting the coils and connecting external electrical leads to the coils comprising: an annular printed circuit board having a plurality of radial notches around the outer periphery, the notches being V-shaped and having an enlarged round opening at the inner converging end of the V-shaped portion of the notches, a portion of the printed circuit forming a plurality of conductive terminals on the surface of the board, with one conductive terminal being adjacent each notch, there being two terminals and associated notches for each coil, adhesive means holding the circuit board against the coils adjacent one end of the core and coaxial with the core, each coil having a portion of the wire wedged into the enlarged openings in said notches and electrically connected to the associated conductive terminals, the wedged wire of the coil anchoring the board against the coils, and a plurality of external electrical leads connected to selected ones of said terminals, the printed circuit board electrically interconnecting the external leads and the coils.

2. Apparatus of claim 1 wherein said adhesive means includes a pressure-sensitive adhesive for holding the surface of the annular printed circuit board to the projecting ends of the wire coils.

* * * * *